Sept. 22, 1959 G. J. GIEL 2,905,897
STROBOSCOPIC VOLT-METER
Filed May 16, 1955 3 Sheets-Sheet 1

GEORGE J. GIEL
INVENTOR.

BY Lynn H. Latta
—ATTORNEY—

Sept. 22, 1959 G. J. GIEL 2,905,897
STROBOSCOPIC VOLT-METER
Filed May 16, 1955 3 Sheets-Sheet 2

GEORGE J. GIEL
INVENTOR.

BY Lynn H. Latta
ATTORNEY

Sept. 22, 1959  G. J. GIEL  2,905,897
STROBOSCOPIC VOLT-METER
Filed May 16, 1955  3 Sheets-Sheet 3
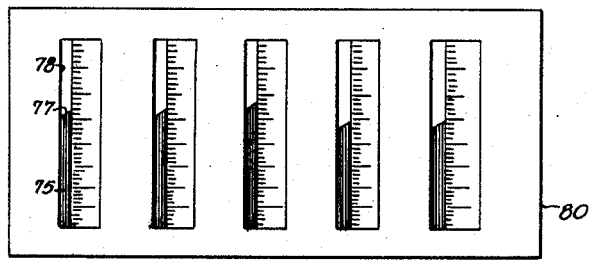
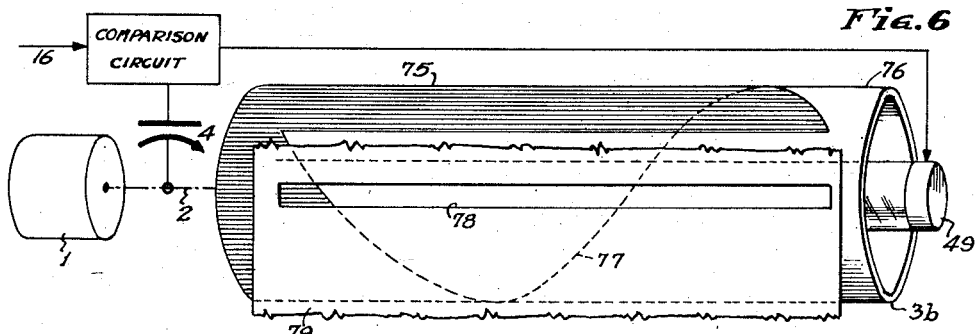
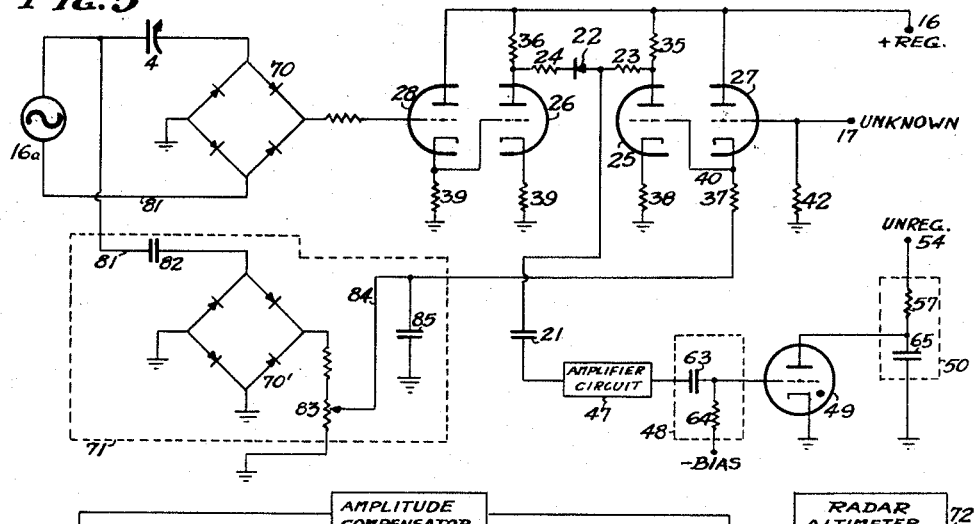
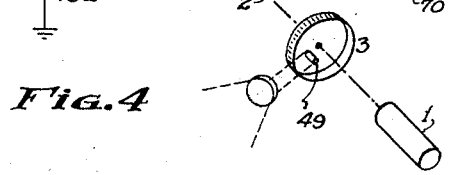
INVENTOR.
GEORGE J. GIEL
BY
Lynn H. Latta
—ATTORNEY—

United States Patent Office 2,905,897
Patented Sept. 22, 1959

2,905,897

STROBOSCOPIC VOLTMETER

George James Giel, Los Angeles, Calif., assignor of one-half to Charles J. Vermilye, Los Angeles, Calif.

Application May 16, 1955, Serial No. 508,356

13 Claims. (Cl. 324—98)

This invention relates to meters in the field of electrical and quantitive measurements. A general object of the invention is to provide an improved meter of simple and inexpensive construction.

A major object is to provide a simplified meter of the digital indicating type. Extensive studies have shown that when metered quantities are presented as decimal digits instead of a conventional scale and pointer reading, the human reading error becomes insignificantly small. However, up to the present time efforts to utilize the digital system in meters of this type have resulted in mechanisms either too slow in their operation due to inherent inertia and friction, or excessively expensive and complex and in most cases too bulky and heavy for commercial instrumentation usage. They have thus been limited largely to laboratory use where such factors are of minor importance. This invention aims to overcome these limitations and to effect an instrument having a much wider application, with high degree of accuracy.

In a broader aspect, the invention contemplates an improved meter wherein a visual indication of any type, whether digital, bar-graph, or other, is presented as a persistency-of-vision composite of recurrent illuminations of a section of an indicator scale.

In general, the objects of the invention are carried into effect by applying to an equality detector circuit to be described later, two electrical quantities, one of which is unknown, the other being of recurrently varying magnitude between minimum and maximum values. A rotating control device, hereinafter referred to as the "function generating impedance" applies to the detector circuit the aforesaid recurrently varying magnitude in the form of a fluctuating uni-directional voltage, and the unknown voltage, simultaneously applied to the detector circuit, is balanced against the fluctuating voltage so that when an instant of equality is reached there is produced a pulse to trigger a high intensity discharge lamp. The flash from this lamp is synchronized with reference to an indicator scale on a constantly rotating dial device so as to illuminate a portion of said scale in a manner to indicate, through a suitable optical system, the value of the unknown voltage.

In a preferred method of carrying out the invention, the function generating impedance takes the form of a constantly rotating capacitor, directly coupled to the transparent scale carrying drum (as by being mounted on a common shaft with the drum) and driven by a small synchronous motor the speed of which is determined by the frequency of the alternating current by which it is energized. Thus, at intervals in direct numerical ratio to such frequency (e.g., 30 times per second) the digit which corresponds to the unknown voltage, is illuminated, and through the phenomenon known as persistence of vision, the recurrently illuminated digit appears as a steady image of the value being measured. Any change in the unknown voltage will result in illumination of a new corresponding digit on the rotating scale.

One of the major objects of the invention is to provide an instrument involving an absolute minimum of parts and complexity, that will present a reading, in terms of decimal digits, of an unknown voltage being measured.

Another object is to provide such an instrument having an inherent accuracy of the order of one part (error) per thousand as contrasted to conventional meters in the same class and price range, having accuracies averaging one to three parts error per hundred.

Another important object is to provide such an instrument that will have no appreciable time lag between the instant of application of the unknown voltage and the presentation of an accurate reading indicating its value.

A still further object is to provide such an instrument that will present a reading in a form such that the most untrained person can read it with a high degree of accuracy. Specifically, the invention contemplates an instrument having means for presenting the reading under illumination of such high intensity as to make it feasible to utilize a fairly high degree of magnification of the scale digit being illuminated, thus eliminating difficulty in reading a digit which, on the revolving scale, is quite small in size in order that the dimensions of the meter as a whole can be kept quite small. Furthermore, the intensity of illumination is such as to enable the reading of the instrument under relatively high ambient light level conditions, and a further object is to provide an instrument which can be easily read under such conditions.

Another important object of the invention is to provide an inexpensive, high accuracy meter that is relatively immune to the effects of shock and vibration, as contrasted to conventional instruments, such as high-accuracy voltmeters, that are not only very expensive, but extremely sensitive to shock and must have extremely careful handling in order to preserve their accuracy.

The invention will now be described in detail by way of example and with reference to the accompanying drawings in which:

Fig. 4 is a schematic illustration of a modified form of the invention;

Fig. 5 is a wiring diagram of a portion of the electrical circuit of Fig. 4;

Fig. 6 is a schematic illustration of another modified form of the invention; and Fig. 7 is a face view of a comparator embodying the invention.

Figure 1:
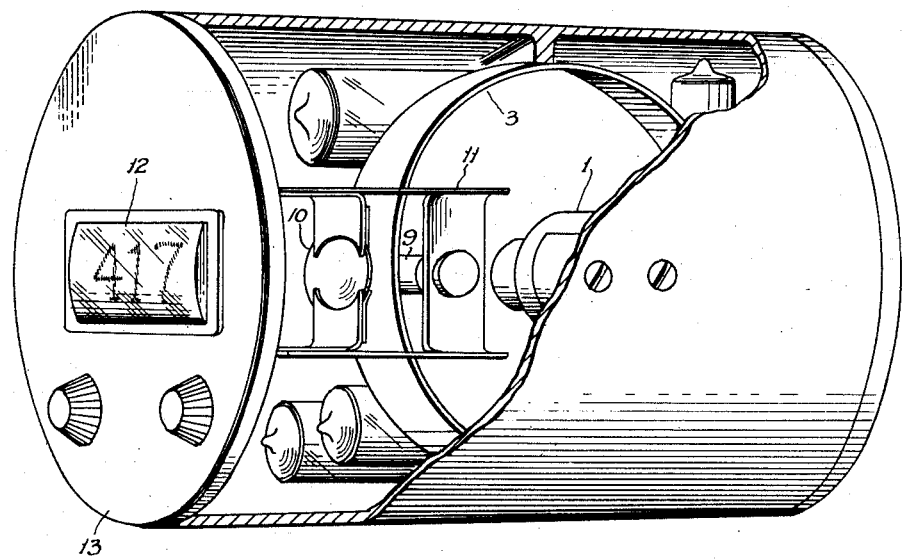
Fig. 1 is an interior section of a side elevation with part of the housing cut away.
Figure 2:
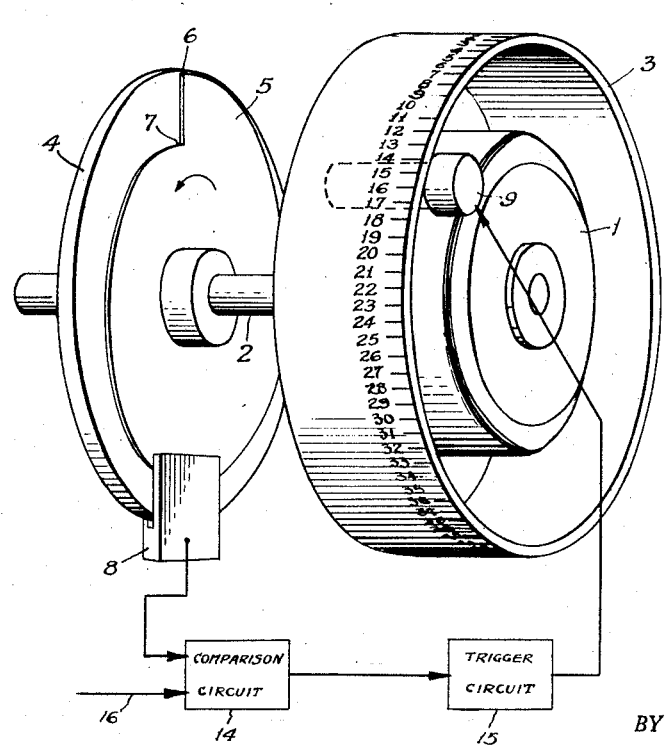
Fig. 2 is a diagram and drawing of the interior components of the invention.
Figure 3:
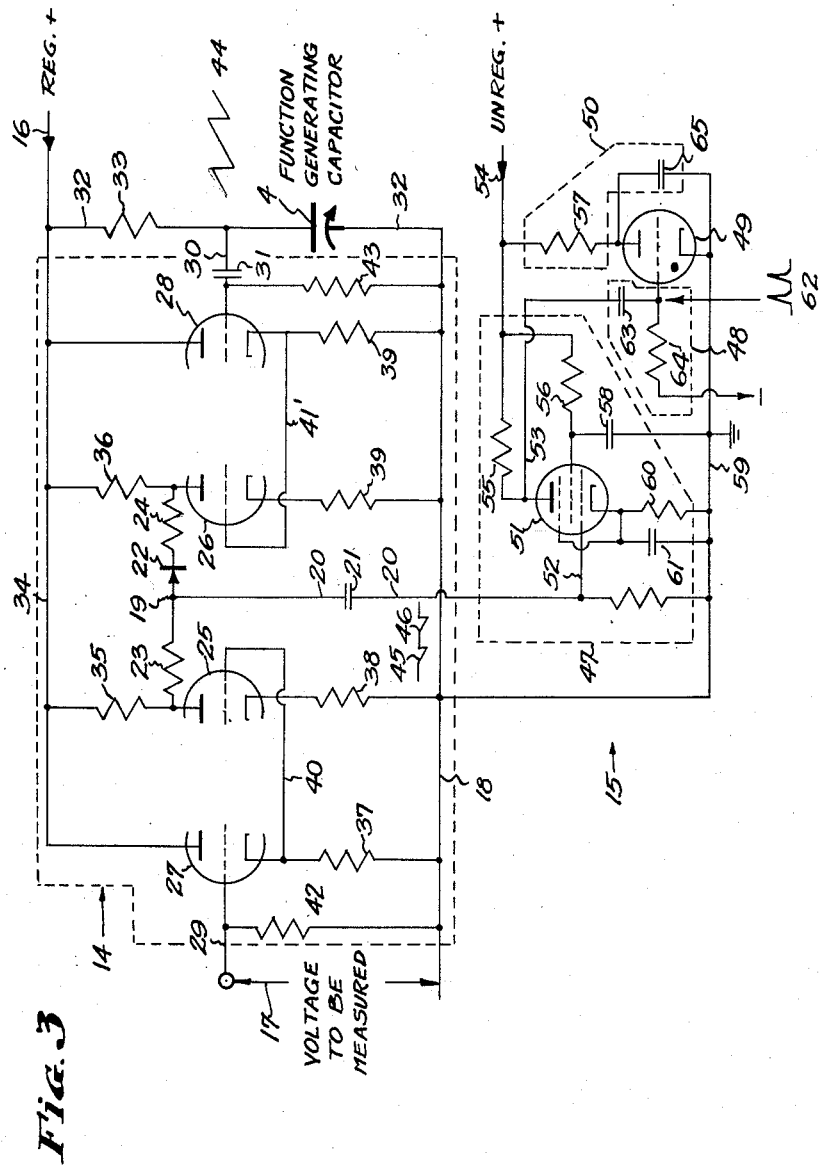
Fig. 3 is a circuit diagram showing the electrical connections of the component parts.

*The invention as shown in Figs. 1–3—Preferred form*

In the preferred form of the invention, a synchronous motor 1 is provided with a shaft 2 on which are adjustably mounted a transparent cylindrical drum 3 which carries a scale of digits on its rim; and a function generating capacitor 4. The capacitor 4 may comprise two or more fixed plates and a rotatable disc or discs of insulating material such as phenolic resin, coated on either or both sides in any known manner (as by photo-etching) with a coating 5 of metal such as copper. Coating 5 has an active area gradually decreasing in radius through 360° from a point of maximum radius indicated at 6, to a point 7 of minimum radius which corresponds to the last position on the transparent drum 3. The fixed plates of the variable capacitor may take the form of a metallic yoke 8, in spaced relationship to the metal coatings 5.

A high intensity discharge lamp 9 and a lens 10 are located in stationary positions on either side of the periphery of the transparent drum 3, as by means of a mounting 11. The lamp 9 is positioned within the drum 3, in close proximity to the inner face of the transparent rim thereof, and preferably with its longitudinal axis parallel to the drum axis, so that its flash may result in a thin line of intense illumination immediately behind a single indicator numeral at a given moment of time, so that such numeral may be illuminated and projected onto a viewing screen 12 by means of the lens 10. Alternately, the scale on the rim of drum 3 may be set against an opaque background and may be illuminated by reflection instead of by transmission, the reflected image being transmitted through a suitable optical system for viewing.

The detector and trigger circuits, shown in block-function at 14 and 15 respectively in Fig. 2, are correlated with capacitor 4 and discharge lamp 9 in a manner such that a source voltage applied to detector circuit 14 at 16, is connected to a ground conductor 18 through capacitor 4, providing a capacitance that gradually decreases from a maximum value to a minimum value, the voltage drop from the source voltage 16 to ground being recurrently varied in direct relation to capacitance changes, the net voltage applied to the grid of follower tube 28 varying from a minimum to a maximum value in inverse relation to the varying capacitance, and the net voltage (sweep voltage), inversely varying from a maximum value to a minimum value and then instantly returning to the maximum value, being thus developed for balancing against the unknown voltage.

At a balance point, indicated at 19 (Fig. 3) a conductor 20, interrupted by a condenser 21, transmits a control voltage (derived from the balancing of the unknown and sweep voltages) to the trigger circuit 15, to control the latter. A diode 22 (with its anode connected to balance point 19 and its cathode connected to a resistor 24) prevents current flow from the sweep voltage side of the detector circuit to the unknown voltage side thereof and thus, so long as the sweep voltage exceeds the unknown voltage, the control voltage applied to the trigger circuit 15 will remain at a constant zero value, and the trigger circuit will remain inactive (except for the charging of the condenser, hereinafter referred to, that stores the energy for the discharge lamp). However, when the sweep voltage drops below the unknown voltage, the diode 22 will allow current to flow from the unknown voltage side of the detector circuit to the sweep voltage side thereof, whereby the voltage at balance point 19 will decline at the same rate as the declining sweep voltage, and a corresponding decline in the control voltage applied to the trigger circuit 15 through conductor 20, will take place.

It is apparent from the foregoing that the unknown voltage is a varying D.C. voltage having a maximum magnitude which is less than the maximum voltage of the sweep voltage and a minimum magnitude which is greater than the minimum voltage of the sweep voltage. In other words, the range of magnitudes of the unknown voltage falls within the selected range variation of the sweep voltage. In this manner, for any magnitude of the unknown voltage, the diode 22 is forward biased at some time during each cycle of the sweep voltage. The repetition rate or frequency of the sweep voltage may be 30 cycles per second. The cyclic variation of the unknown voltage to be measured is relatively small to avoid forward biasing the diode 22 twice during one cyclic operation of the capacitor 4 and to avoid changing the viewed numerical indication at the viewer 12 at speeds which produce a continuous blurred image. The unknown voltage, therefore, varies quite slowly with respect to the variation of the sweep voltage. Illustratively, the unknown voltage may be considered constant for a number of successive cycles of the sweep voltage. Because of this relative difference in rate of variation with the unknown voltage being continuous and substantially constant between successive cycles of the sweep voltage, the unknown voltage may be referred to as a sustained or continuous voltage. The unknown voltage is not intermittent but is continuous having cyclic variations, if any, at a relatively small frequency compared to the frequency of the cyclic operation of the capacitor 4.

The relationship between indicator drum 3 and function generating impedance 4 is such that the zero number on drum 3 corresponds to the angular position of impedance 4 at its maximum voltage output. It will now be apparent that the discharge lamp flashes are synchronized to the indicator digits on drum 3 in a manner such that the illuminated digit will in all cases indicate the value of the unknown voltage.

Although the invention contemplates the possibility of utilizing a very simple circuit wherein the unknown voltage and sweep voltage may be applied directly (except for the interposition of resistors 23 and 24) to the respective sides of balance point 19 and diode 22, as hereinafter more fully explained, I prefer, for the purpose of maximum accuracy, to utilize, for application to the respective sides of diode 22, derivative voltages which are developed through opposed amplifier triodes 25, 26 respectively, and to interpose between the respective triodes 25, 26 and the respective voltage application points 17 and 16, cathode follower tubes 27, 28 respectively, which develop high impedances between the unknown voltage and the sweep voltage, on the one hand, and the amplifier triodes 25, 26 on the other hand. This avoids deterioration of the unknown voltage and source voltage to false values.

The unknown voltage, at 17, is applied through a conductor 29 to the control grid of cathode follower tube 27. Similarly, a sweep voltage is applied, through a conductor 30 and condenser 31, to the grid of cathode follower 28. This sweep voltage is generated by the capacitor 4 (recurrently varying in a gradual decline from maximum capacitance to minimum and quickly back to maximum) and thus recurrently varying the voltage drop from a regulated source 16 to ground conductor 18 through a conductor 32 and a resistor 33, in series therewith; and inversely varying the voltage applied to conductor 30 in a wave form indicated at 44.

The anodes of the four triodes 25, 26, 27, 28 are connected to voltage source 16 in parallel through a conductor 34 and resistors 35, 36. The cathodes of the four triodes 25–28 are connected, through resistors 37, 38, 39 and 40 to ground wire 18, said resistors 37–40 biasing said cathodes (and the grids of amplifier triodes 25, 26, connected thereto by means of shunts 41, 41') at selected potential elevations above the zero potential of wire 18.

By presenting high impedances to the voltages applied at 29 and 30 (thus avoiding decay of the unknown and sweep voltages to false values) the follower tubes 27, 28, in response to changes in their respective grid potentials, will regulate the voltage levels of their respective cathodes and of the grids of amplifier tubes 25, 26, correspondingly varying the anode potentials in tubes 25, 26 and the voltages applied to resistors 23, 24, and the derived voltages, applied to the respective sides of diode 22.

The fluctuating voltage that is developed from the rotation of function generating capacitor 4 and applied to the control grid of tube 28, is represented by the sawtooth symbol 44, indicating a sustained, gradual increase in voltage, followed by a rapid return to a minimum value. A sweep voltage of inverse sawtooth form is developed therefrom and applied to diode 22. The control voltage derived from the balancing of the sweep voltage against the unknown voltage, follows a curve representing a composite of the two, and indicated by the symbol 45. The instant of equality, where the decline of the control voltage begins, is indicated at 46.

The trigger circuit 15 embodies several components, namely a pentode amplifier unit 47, a differentiator circuit 48, a discharge lamp 49, and an accumulator circuit 50 for energizing the lamp. Pentode amplifier unit 47 includes a pentode tube 51, the control grid of which is connected to control conductor 20 at 52. Its plate is connected to a conductor 53 leading to the grid of the discharge lamp 49, for controlling the firing thereof. A voltage 54 is applied through parallel connections including selected resistors 55, 56 and 57 to the plate of pentode 51, the screen grid of the latter, and the plate of the discharge lamp 49 respectively. A point between the screen grid and resistor 56 is connected through a condenser 58 to a ground conductor 59. The pentode cathode is biased by parallel connections to ground 59 through a resistor 60 and a capacitor 61 respectively. Voltage changes at grid connection 52 are highly amplified in the plate current of pentode 51 and, in such amplified form, are transmitted through conductor 53 to the differentiator 48, where the high rate of change sections (square-wave fronts) of the control wave 45 are converted into sharp pulses, as represented by the symbol 62.

The differentiator 48 consists in a small capacitance 63 and a low resistance 64, the former interposed in conductor 53 and the latter in a connection from the discharge lamp grid to a negative potential, by which the discharge lamp grid is normally given a negative bias for inhibiting ionization thereof. This arrangement of low resistance and low capacitance converts the anode voltage of pentode 51 into the succession of pulses 62 which intermittently raise the bias of the discharge lamp grid, during periods of extremely short duration and sharply defined occurrence, to high positive levels so as to cause the discharge lamp 49 to intermittently conduct during very short duration periods at intervals of highly accurate timing with relation to the position of rotation of dial 3.

During the much longer periods between pulses 62, the discharge lamp 49, rendered non-conductive by the depletion of the energy of the storage capacitor 65, will remain quiescent while energy, for the next firing, is built up on a high capacity condenser 65 of the firing circuit 50. The current comes to condenser 65 through a high resistance 57, the resistor 57 and condenser 65 being connected in series between voltage source 54 and ground wire 59, and there being a connection to the discharge lamp plate between condenser 65 and resistor 57, whereby the full charge of condenser 65, accumulated during the extended non-conductive period, will be discharged through the lamp 49 at the instant its grid is rendered positive by a pulse 62, thereby firing the lamp.

In the preferred form of the invention described above, the value of the sweep voltage generated by capacitor 4 progresses linearly between its limit values, and it is therefore possible to utilize even spacing between the indicator numerals on the rim of drum 3. For such a digital indicator, where there will be occasion to read the entire scale from minimum to maximum values, the linear characteristic is preferred. However, it is to be understood that the rate-of-change of the sweep voltage need not necessarily be linear, and that for some applications, where readings will normally be taken only at one extremtiy of the scale, it may be preferable to have a non-linear (e.g. accelerating or decelerating) rate of change so that the indicator numerals may be relatively widely spaced at the end of the scale where most frequent readings will be taken, and will be crowded at the end of the scale where readings will not normally be taken. Furthermore, by proper selection of the shape of metal coatings 5, a sweep voltage that varies in accordance with any selected formula (within limits) may be generated, and compensation for any non-linearities occurring elsewhere in the system can be thus attained.

The invention provides a flexibility of adaptation to various requirements, such that the user may choose the combination of reading accuracy, size, and location of parts that best meet his needs. For instance, a reading accuracy of at least 8 times that provided by available instruments of comparable size, can be afforded by the invention.

For energizing the drive motor 1, the preferred form of the invention described above contemplates a common power source which may utilize a 60 cycles per second alternating current, regulated to a uniform frequency. For example, common household 110 volt, 60 cycle current, regulated at source so as to be available for accurate operation of electric clocks, may be utilized. The synchronous motor 1 may then be an 1800 r.p.m. motor (providing 30 revolutions per second in the operation of the meter) and thus the frequency of repetition of the discharge lamp flashes (30 r.p.s.) will be well within the range of frequencies required for satisfactory persistence-of-vision operation, which range should not drop below 18 cycles per second at its lower limit. The capacitor 4 may be operated at unvarying r.p.m., a constant speed being required for the reason that the sweep voltage generated from its rotation is a function of its rotational rate, and will vary with changes in rotational rate. Thus, in order that the sweep voltage may be depended upon as an accurate reference voltage for balancing against the unknown voltage, the speed of the capacitor must be uniform.

Voltage source 16 is a direct voltage of non-fluctuating intensity.

The following construction details are preferably embodied in the meter in its preferred form: the case may be of heavy cast aluminum with the entire electronic assembly mounted in vibration cushioning mountings to prevent external noise or microphonics within the instrument. The rotating capacitor is completely shielded and bonded to prevent stray pick-ups. A ball and spring assembly may be used on the shaft as an end bearing to prevent end play.

A reasonable drum diameter dictates that the indicator numbers be small and close together, easy reading being provided for by the optical enlargement afforded by the high intensity light available from the strob lamp.

The function generating impedance 4 might take many other forms; for example, a variable resistance such as a potentiometer, connected between constant source voltage 16 and the grid of follower tube 28, either in series, or as a variable shunt to ground, to develop the sweep voltage from which the control voltage is derived at balance point 19; or a variable magnetic or variable opto-electrical or other variable function generating devices that will readily present themselves to those versed in the art.

Function generating capacitor 4 may be interposed in series between source 16 and grid connection 30, with resistor 33 on the ground side, in which case zero capacitance can be related directly (instead of inversely) to zero number on the scale of drum 3.

The indication is digital in that progressive numerals are displayed. However, rather than "flashing numbers" which may be unstable in the last place or which may be continuously and confusingly changing, the indicator appears to "slide" from one integral number to the next and hence, allows better control of a system by an operator as trends as well as absolute numbers may be observed. It is to be noted that the measuring system has no inertia and responds to a step function within human perception.

*The modified form of the invention shown in Fig. 4*

As shown in Fig. 4, the invention contemplates the possibility of dispensing with the above described synchronous motor (which requires an accurately timed source of alternating current for energizing the same) and utilizing a high-frequency carrier wave as the source of the voltage fed to capacitor 4. In the arrangement shown in Fig. 4, instead of the fixed voltage source 16 of Figs. 1–3, there is provided a high frequency sine-wave generator 16a which, for example, may take the form of a 100 kilocycle crystal oscillator. Oscillator 16a is connected, as shown, to deliver its output through function generating capacitor 4 to a rectifier 70, the capacitor 4 recurrently varying the transmitted sine wave between minimum and maximum voltages, whereby there is developed a sweep voltage which, after smoothing, recurrently varies, at relatively low frequency, between maximum and minimum voltages. This control wave is fed to comparison circuit 14, the same as in the preferred form of the invention, to produce a signal that is applied to trigger circuit 15 to recurrently energize the discharge lamp 49, the same as in the previously described arrangement. It is to be understood that the comparison circuit 14 and trigger circuit 15 are intended to be the same in this modified form of the invention as disclosed in Fig. 3 and as described with reference thereto.

In the use of a carrier oscillator as a source for the sweep voltage, the problem of irregularity in amplitude, is encountered, and it is necessary to provide amplitude control through suitable compensation circuits. Amplitude control is provided for by an amplitude compensator, shown in block function at 71 in Fig. 4 and in detail in Fig. 5.

A small portion of the oscillating voltage from generator 16a is coupled through a conductor 81 and capacitor 82 into a rectifier 70' constituting a part of compensator 71, and is taken through a potential divider 83 and a conductor 84 to the cathode of tube 27 through resistor 37, with a smoothing capacitor 85 connecting conductor 84 to ground.

Thus a compensatory voltage is introduced into the measurement side of the comparison circuit, for each change in the general voltage level on the sweep side of the circuit.

Other methods of introducing this compensatory voltage will be evident to those well skilled in the art, upon consideration of the several embodiments of the invention disclosed herein.

Use as altimeter

A use to which the invention can be advantageously applied, is that of a radio altimeter. Fig. 4 illustrates broadly how the sweep voltage can be balanced against an unknown voltage derived from the echo of a radar signal developed in a radar altitude meter 72, the echo pulses being fed through a translator 73 which measures the time interval between the transmitted and reflected pulses into a unidirectional voltage that is steady except for fluctuations determined by elevational irregularities in the terrain over which the aircraft flies. This direct voltage is applied to the comparison circuit 14 of the altimeter as the unknown voltage that is read by the meter, thus producing a visual indication in terms of altitude.

Bar-graph embodiment—Fig. 6

Fig. 6 illustrates how the invention may provide a bar-graph type of visual indication instead of the digital indication described above. Instead of the drum 3 with digital scale on its rim, this form of the invention provides an elongated cylinder 3b of relatively small diameter, having contrasting areas 75 and 76, preferably dark and light respectively, defining, where they meet, a helical indicator line 77 of 360° arcuate extent, and which may extend substantially the length of the cylinder, which thus determines the extent of movement of the bar indicator. Bar indication is developed by viewing the dark area 75 through a viewing slit 78 in a mask 79 comprising the dial face of the instrument. The area 76 is preferably a transparent section of cylinder 3b (or may simply be an open space) and the area 75 is completely opaque and may consist in any suitable coating on the surface of the transparent cylinder. In such an arrangement the strob lamp 49 may be positioned within the cylinder 3b, at the axis thereof and extending the full axial length of the indicator line 77. In operation, the flash of the strob lamp 49 will "stop" the movement of dark area 75 which, as viewed through slit 78, is a recurring movement along the length of the slit, and, depending upon the position of rotation at which the flash occurs, a dark bar, the length of which is a measure of the unknown voltage, will appear in the slit 78. Other components of the apparatus may be the same as in the preferred form of the invention, and corresponding reference numerals are applied to such components, indicated in block function. Alternatively, a carrier wave may be used as a source for the sweep voltage, and electronic components such as those illustrated in Figs. 4 and 5, may be combined with the indicator cylinder and strob lamp components of Fig. 6.

Comparemeter

Fig. 7 discloses how a number of the bar-graph meters of Fig. 6, each with its separate comparison circuit 14, may be assembled in a common casing 80 with their respective indicator cylinders and viewing slits 78 in parallel relation.

Although in some special cases separate sweep generators and driving motors may be desirable, it is contemplated that the usual display array will have but one sweep generator and driving motor. It is to be noted that backlash is no problem as the direction of motion is unchanging.

As previously mentioned, the indication need not be linear. It consists of only an opaque edge of any suitable material. A very easy method is therefore afforded to make the indication non-linear or to compensate for any unwanted non-linearities that may occur elsewhere in the system.

In many cases where meters are employed the operators scan them almost continuously for assurance of the normal operation of the connected apparatus and actually read them only when malfunction occurs. Examples of such usages are in aircraft and large power stations. When conventional, moving pointer meters are used much training and experience is necessary before operators get the "feel" of their instruments and so are properly alarmed by an abnormal indication. The device disclosed overcomes this difficulty as it presents all readings as lengths of illuminated lines. In such usage the scale factors of each instrument would be so preadjusted that a normal condition of connected apparatus would prevail when the ends of all "bars" are in horizontal alignment. Since both the metering system and the indication can, if necessary, be non-linear, the composite assembly of "bars" can be made to convey further information. For example, the indication could be so arranged that, when an aircraft reduces altitude with all mechanisms functioning in the prescribed fashion, all the "bars" of the line decrease in length. A malfunction of any component would then still be indicated by the departure of one or more "bars" from the horizontal line. Similarly, additional information could be conveyed by any geometrical relation of the "bars."

I claim:

1. An electrical meter comprising, in combination: a rotatable indicator device having indicator means representing direct readings of voltage extending around its periphery; a discharge lamp for intermittently illuminating a section of said indicator means at a fixed point to produce a visual impression of said section through persistence-of-vision effect; a trigger circuit for intermittently flashing said lamp; a comparison circuit having connections for applying thereto a sustained unknown voltage and a source voltage; a rotatable function generating impedance for developing an impedance recurrently varying substantially linearly between minimum and maximum values, means for rotating said function generating impedance in synchronous relation to said indicator means and to said comparison circuit such as to develop from said source voltage a control voltage recurrently varying in positively fixed synchronism with the rotation of said indicator means past said fixed point of illumination; said comparison circuit including means for balancing said control voltage against the unknown voltage so as to derive, at a point of equality between the balanced voltages, a voltage change for activating said trigger circuit to produce a flash in said lamp; and drive means for rotating said indicator device and said function generating impedance in mutually timed relation.

2. A meter as defined in claim 1, including an oscillator for generating a high frequency carrier wave as the basis for said source voltage, said oscillator being connected to said function generating impedance so that the latter will modulate said carrier wave in low frequency modulation cycles; an amplitude compensator to compensate for irregular variations in the amplitude of said carrier wave; and a rectifier to transform the modulated carrier wave into a low frequency square-front wave to constitute said control voltage.

3. A meter as defined in claim 1, in the form of an altimeter apparatus including a radio altitude sounding device for sending and receiving a regularly recurring series of radar pulses and echoes; and a translator for measuring the time intervals between the transmitted pulses and the echoes and for deriving from such measurements a voltage constituting the unknown voltage, the measurement of which, by said meter, constitutes an indication of altitude.

4. A meter as defined in claim 1, wherein said rotatable indicator comprises a cylinder having on its periphery, means defining a helical indicator line; and a mask having a viewing slit through which a section of said indicator line is viewed by the intermittent illumination thereof; the measurement indication being derived from the apparent position of progression of the viewed section along the length of said slit, produced by said intermittent illumination.

5. A meter as defined in claim 1, wherein said rotatable indicator comprises an elongated cylinder of transparent material having an opaque coating upon one peripheral area thereof and having an adjacent peripheral area that is light-transmitting, said areas, where they adjoin, defining a helical indicator edge; and a mask having a viewing slit through which a section of said opaque area is viewed as a dark line while a section of said light-transmitting area is viewed as light line as the result of the intermittent illumination produced by said discharge lamp, the apparent length of said dark line constituting the measurement indication, said discharge lamp being disposed within the cylinder, and parallel to the axis thereof.

6. A meter as defined in claim 1, wherein said rotatable indicator comprises a drum having a numerically progressive series of indicator numerals extending circumferentially around its periphery, constituting said indicator means.

7. A meter as defined in claim 1, wherein said rotatable indicator comprises a drum having a transparent rim; wherein said indicator means comprises a numerically progressive series of indicator numerals upon said rim; and wherein said discharge lamp is disposed inside the drum and transmits its flashes through said transparent rim to recurrently illuminate one of the numerals thereon.

8. A meter as defined in claim 1, wherein said function generating impedance comprises a variable capacitor including a disc of dielectric material having on a side face thereof a metallic coating having an active area which progressively varies in diameter from one limit to another limit through substantially a 360° arcuate extent and returns to said one limit within substantially zero circumferential extent, and a fixed condenser plate radially traversing said active area in juxtaposition thereto; said indicator means correspondingly varying unidirectionally from one limit value to another around substantially a 360° extent of the periphery of said rotatable indicator and sharply returning to the one limit value.

9. A meter as defined in claim 1, including means to apply, as the source voltage, an alternating current of regulated frequency, and a synchronous motor which can utilize said alternating current as its energy source, and will operate at a speed which is a uniform multiple of the frequency of said alternating current.

10. A meter as defined in claim 1, wherein said indicator means extends progressively throughout the full circumference of said rotatable indicator.

11. A stroboscopic volt meter comprising, in combination: a rotatable impedance generator adapted when rotating to generate an impedance varying recurrently between maximum and minimum values; a rotatable indicator drum carrying on its periphery a scale of indicia representative of direct readings of voltage; driving means in synchronized driving relationship to said impedance generator and said drum, for rotating them in synchronized relation to one another; a discharge lamp for intermittently illuminating a section of said scale at a fixed point with a stroboscopic visual effect; a trigger circuit intermittently flashing said lamp in synchronism with the rotation of said drum and impedance generator; a comparison circuit having connections for applying thereto a sustained unknown voltage and a source voltage and said recurrently varying impedance, including means for deriving from said recurrently varying impedance a sweep voltage varying in step with said impedance, and including means for balancing said sweep voltage against said sustained unknown voltage for deriving a control voltage and for applying said control voltage to said trigger circuit to control the same, said balancing means including a one-way conductor for preventing current flow from the sweep voltage side of said comparison circuit to the unknown voltage side thereof so as to maintain the control voltage at a constant inoperative value so long as the sweep voltage exceeds the unknown voltage, and to conduct current from the unknown voltage side of said comparison circuit to the sweep voltage side thereof when the sweep voltage drops below said unknown voltage, for starting a change in said control voltage at the point of equality between said unkown and sweep voltages; said trigger circuit including means responsive to said starting of change in the control voltage for triggering the flash of said lamp.

12. A stroboscopic volt meter as defined in claim 11, wherein said trigger circuit includes a differentiator for directly deriving from the wave fronts of said control voltage, a series of sharp trigger pulses and for applying said trigger pulses to said lamp for firing the same.

13. A stroboscopic voltmeter comprising, in combination: a variable capacitor impedance generator comprising a disc of dielectrtic material having on a side face thereof a metallic coating with an active area which progressively varies between maximum and minimum limits through substantially a 360° circumferential extent and returns to a starting point within substantially zero circumferential extent, and a fixed condenser plate radially traversing said active area in juxtaposition thereto, said generator adapted when rotating to generate an impedance varying recurrently between minimum and maximum values; a rotatable indicator drum carrying on its periphery a scale of indicia representative of direct readings of voltage and varying unidirectionally from one limit value to another around the same circumferential extent as said capacitor; driving means in synchronized driving relationship to said capacitor and said drum, for rotating them in fixed relation to one another; a discharge lamp for intermittently illuminating a section of said scale at a fixed point with a stroboscopic visual effect; a trigger circuit for intermittently flashing said lamp in synchronism with the rotation of said drum and impedance generator; a comparison circuit having connections for applying thereto a sustained unknown voltage and a source voltage and said recurrently varying impedance, including means for deriving from said recurrently varying impedance a sweep voltage varying in step with said impedance, and including means for balancing said sweep voltage against said sustained unknown voltage for deriving a control voltage and for applying said control voltage to said trigger circuit to control the same, said balancing means including a one-way conductor for preventing current flow from the sweep voltage side of said comparison circuit to the unknown voltage side thereof so as to maintain the control voltage at a constant inoperative value so long as the sweep voltage exceeds the unknown voltage, and to conduct current from the unknown voltage side of said comparison circuit to the sweep voltage side thereof when the sweep voltage drops below said unknown voltage, for starting a change in said control voltage at the point of equality between said unknown and sweep voltages; said trigger circuit including means responsive to said starting of change in the control voltage for triggering the flash of said lamp.

References Cited in the file of this patent

UNITED STATES PATENTS

| | | |
|---|---|---|
| 2,279,232 | Graham | Apr. 7, 1942 |
| 2,426,245 | Skellett | Aug. 26, 1947 |
| 2,522,923 | Bourn | Sept. 19, 1950 |
| 2,612,132 | Triplett | Sept. 30, 1952 |